July 11, 1950

C. C. KLENKE 2,514,771

VEGETABLE HARVESTER

Filed July 7, 1948

C. C. KLENKE 2,514,771

VEGETABLE HARVESTER

Filed July 7, 1948

Chris C. Klenke
INVENTOR.

BY Clarence A. O'Brien
and Harvey B. Jacobson
Attorneys

July 11, 1950

C. C. KLENKE 2,514,771

VEGETABLE HARVESTER

Filed July 7, 1948

Chris C. Klenke
INVENTOR.

BY *Clarence A. O'Brien
and Harvey B. Jackson*
Attorneys

Patented July 11, 1950

2,514,771

UNITED STATES PATENT OFFICE 2,514,771

VEGETABLE HARVESTER

Chris C. Klenke, Ashton, Ill.

Application July 7, 1948, Serial No. 37,459

4 Claims. (Cl. 56—1)

This invention relates to new and useful improvements in vegetable cutting machines and the primary object of the present invention is to provide a machine for cutting, conveying, and packing vegetables such as asparagus and the like, and which is so designed as to permit a single attendant to efficiently and effectively control the above operations in a convenient manner.

Another important object of the present invention is to provide a vegetable cutting machine including a novel and improved vegetable elevating conveyor that is so constructed as to sieve or thin out relatively small vegetables as the same are being elevated to a delivery conveyor.

Another object of the present invention is to provide a cutting machine having an elevating conveyor for lifting cut vegetables such as asparagus, a delivery conveyor that will receive vegetables from the elevating conveyor, and a novel and improved conveyor removably supporting a container or groups of containers that will be moved to a position for receiving the vegetables displaced from the delivery conveyor.

Another object of the present invention is to provide a machine for cutting, conveying and packing vegetables, including a cutter, an elevating conveyor, a delivery conveyor, a roller for directing cut vegetables to the elevating conveyor and embodying novel and improved means for operatively connecting each of the above referred to elements to a source of power, such as the power take-off shaft of a tractor.

Another object of the present invention is to provide a vegetable cutting machine including a delivery conveyor that is provided with a means for reducing the normal size of a vegetable being conducted by the same.

Another object of the present invention is to provide an asparagus cutting machine involving an elevating conveyor, a delivery conveyor at the upper end of said elevating conveyor and baffle means for dividing the asparagus on the elevating conveyor into sections or groups which will be conducted to the delivery conveyor.

A further object of the present invention is to provide a machine for cutting and conveying asparagus and for packing the cut asparagus into containers that is extremely small and compact in structure and which is quickly and readily applied to a towing vehicle such as a tractor or the like, to be operated by the power take-off shaft of a tractor.

A still further aim of the present invention is to provide a vegetable cutting machine that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 8 is an enlarged transverse vertical sectional view taken substantially on the plane of section line 8—8 of Figure 1;

Figure 9 is a fragmentary longitudinal vertical sectional view, in an enlarged scale, taken substantially on the plane of section line 9—9 of Figure 7; and, Figure 10 is an enlarged fragmentary longitudinal vertical sectional view taken substantially on the plane of section line 10—10 of Figure 2.

Figure 1:
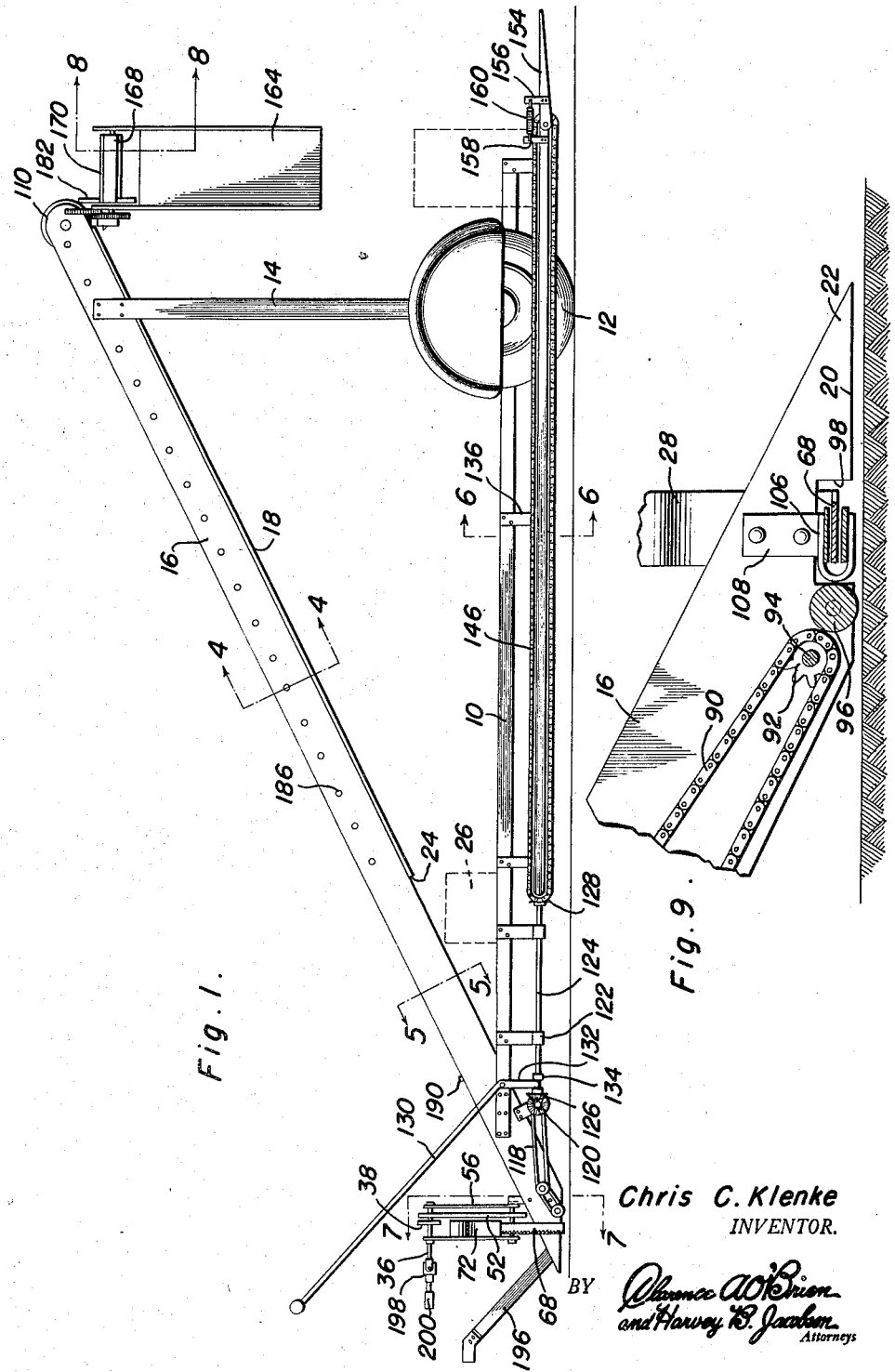
Figure 1 is a side elevational view of the present vegetable cutting machine.

Referring now to the drawings in detail, wherein for the purpose of illustration, there is disclosed a preferred embodiment of the present invention, the numeral 10 represents a substantially rectangular and open frame that supports in any suitable manner a rear pair of wheels 12 which retain the frame in an elevated position above the ground. This frame is provided with any suitable number of cross members, ties or bracing that will properly support and prevent swaying of the same when in use.

A pair of posts 14 rise from the sides of the frame 10, at the rear portion thereof, and are secured to the spaced parallel, longitudinal side walls 16 of an elongated, substantially channel-shaped trough 18 adjacent the rear end of the said trough. The forward portion of the trough 18 is fixed between the sides of the frame 10 so that the trough will be retained in a downwardly and forwardly sloping position, as shown best in Figure 1 of the drawings.

The lower, forward ends of the side wall 16 are cut off as at 20 to provide substantially horizontal edges which will be spaced above the ground over which the present machine is moving and to form pointed extremities 22 between which there will be confined an area of vegetables that are to be cut.

The bottom wall of the trough 18 terminates substantially medially the length of the side walls 16 to provide a forward opening 24 under which there is disposed and supported a suitable container 26, that will receive relatively small vegetables that are being conveyed or lifted to an elevated position in a manner presently to be described.

Pairs of upstanding support arms 28 are fixed to the outer surfaces of the side walls 16, at the forward ends thereof, and support a pair of spaced, transverse, substantially horizontal beams 30 from the ends of which there depend pairs of links 32 and 34.

A main driven shaft 36 is journalled for rotation on the beams 30 and supports a pulley 38 that is disposed between the beams 30 and which is provided with a pair of grooves that engage endless belts 40 and 42, respectively.

A further pair of shafts 44 and 46 are supported by the beams 30 and carry pulleys 48 and 50 that engage the belts 40 and 42, respectively. The pulley 48 is provided with a pair of grooves, one of which receives the belt 42 and the remaining of which engage a further endless belt 52, while the pulley 50 supports a reduced pulley 54 that engages another endless belt 56.

Rotatably supported on a lower shaft 58 between the links 34, is a drive wheel 60 having a pulley 62 fixed thereto that engages the belt 52, whereby the wheel 60 will be rotated by the pulley 48. This wheel 60 cooperates with a further wheel 64 that is rotatably mounted on a shaft 66 carried by the links 32 and engages an endless, resilient saw blade or cutter blade 68, the upper flight of which is shielded by a guard strip 70 secured between the links 32 and 34 having downwardly arcuated end portion 72.

Rotatably supported in sleeves or bearings 74 mounted on one side wall 16 of the trough 18, is a longitudinal shaft 76, the forward terminal of which is connected, by a universal coupling 78, to a shaft 80 that is journalled on a strap 82 which depends from the beam 30.

A pulley 84 is fixed on the latest shaft, 80, and engages the belt 56 whereby the shaft 76 will be rotated by the pulley 50.

Rotatably supported by the side wall 16, is a transverse shaft 86, the ends of which support sprockets 88 about which there is trained a pair of link chains 90 that extend forwardly in spaced parallelism to engage a further pair of spaced sprockets 92 that are mounted on a further transverse shaft 94 carried by the side walls 16, adjacent the forward ends thereof. The latest sprockets 92 are of a relatively smaller size than the sprockets 88.

A roller 96 rotatably supported between the side walls 16, adjacent notches 98 therein, supports a pulley 100 that is connected to a pulley 102 on the shaft 94 by an endless belt 104 which engages one of a pair of grooves provided in the pulley 102.

Notches 98 are provided in the side walls 16, adjacent the forward pointed ends 22 thereof, so that channel guides 106, which are secured by arms 108 to the side walls 16, will engage and retain the lower flight of the saw blade or cutter 68 spaced above the ground and substantially parallel to the roller 96.

An enlarged bevel gear 110 is suitably mounted on the shaft 86 and engages a relatively small bevel gear 112 mounted on the longitudinal shaft 76, whereby the chains 90 will be rotated at a substantially low rate of speed.

An outwardly extending shaft 114 that is rotatably carried by one side wall of the trough 18, supports a pulley 116 that is connected to the pulley 102 by a belt 118, and a bevel gear 120.

Journal bearings or sleeves 122 fixed to one side wall of the trough 18, rotatably support a shaft 124 having bevel gears 126 and 128 secured thereon, one of which, for example 126, is keyed thereon for sliding movement to engage the bevel gear 120 on shaft 114.

In order to actuate the gear 126 into and out of engagement with the gear 120, there is provided a lever 130 that is pivoted to one side wall of the trough and which includes an angulated end portion 132 that engages between the gear 126 and a fixed stop 134 on the shaft 124, for forcing the gear 126 into engagement with the gear 20 as the lever is raised manually.

Fixed to one side of the frame 10, by spacing brackets or hangers 136, is an elongated substantially rectangular and horizontal trough 138 that rotatably supports a pair of transversely disposed shafts 140 on each of which there is fixed a pair of sprockets 142 and 144. The sprockets 142 and 144 of the respective shafts are connected by endless link chains 146 and 148.

The forwardmost of the shafts 140 supports a bevel gear 150 that engages the gear 128.

A plurality of spaced, parallel cross bars 152 are suitably fixed between the chains 146 and 148, rotate with the chains 146 and 148, and support a suitable container or containers (not shown) in a manner presently to be described.

Pivotally secured to the sides of the trough 138, is a rear platform or ramp 154 to which there is fixed a pair of upstanding lugs or arms 156. These arms 156 are connected to further arms 158 fixed to the sides of the trough 138 by resilient elements or coil springs 160 that will retain the said platform in a substantially horizontal position, see Figure 10.

Suitably fixed to the rear portion of the trough 18 by brackets or the like (not shown) is a transversely disposed, substantially channel-shaped member 162 having a downwardly directed end portion 164 that is disposed over the rear portion.

A pair of spaced parallel rollers or resilient sleeves 166 are rotatably supported by the sides of the member 162 and there is trained about the rollers 168 an endless, preferably resilient or fabric belt or conveyor having longitudinally spaced, transverse fingers or ribs 170.

The rollers 168 are provided with reduced ends or axles 172, keyed thereto, which are rotatably supported on the member 162.

Figure 2:
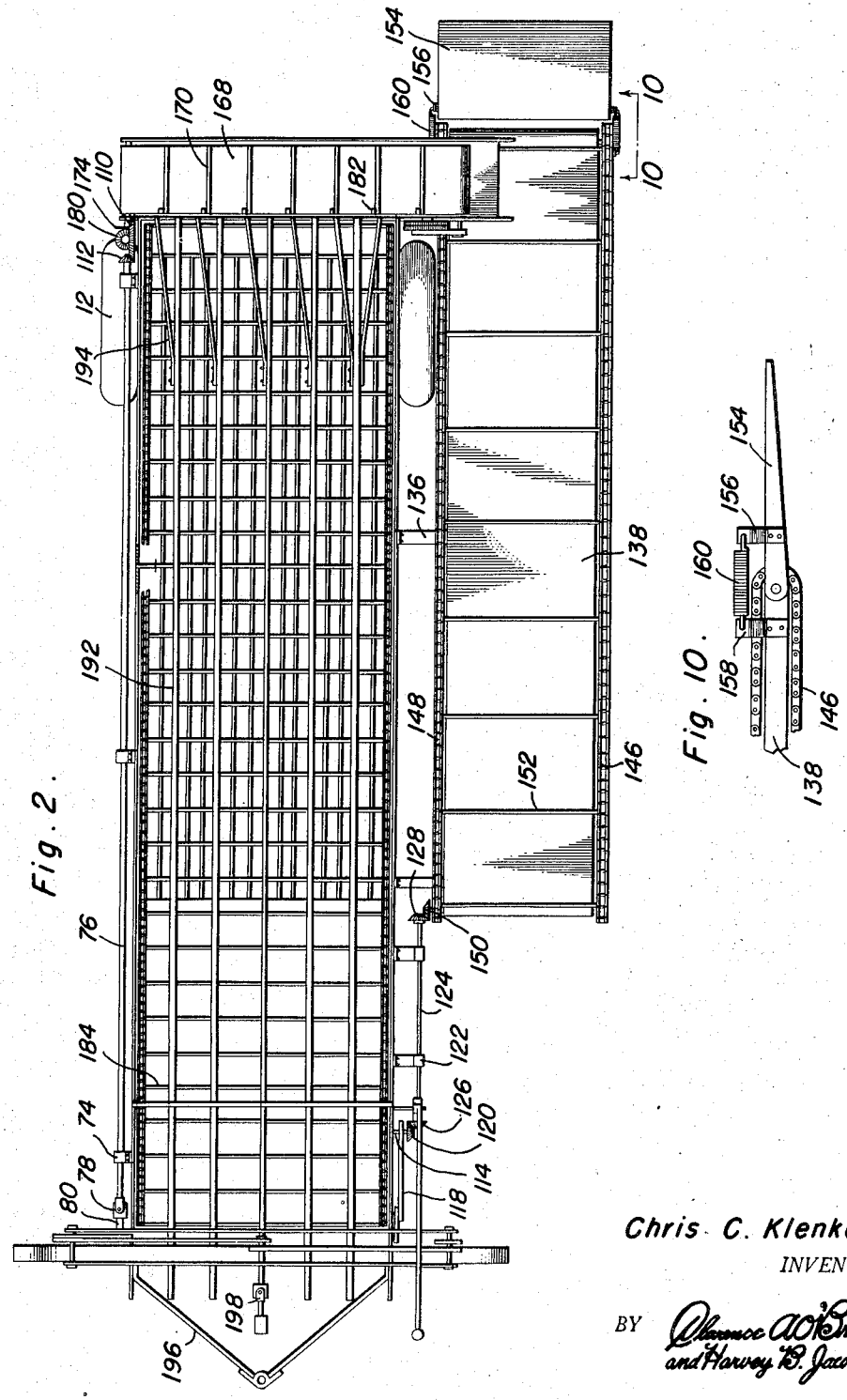
Figure 2 is a top plan view of Figure 1.
Figure 3:
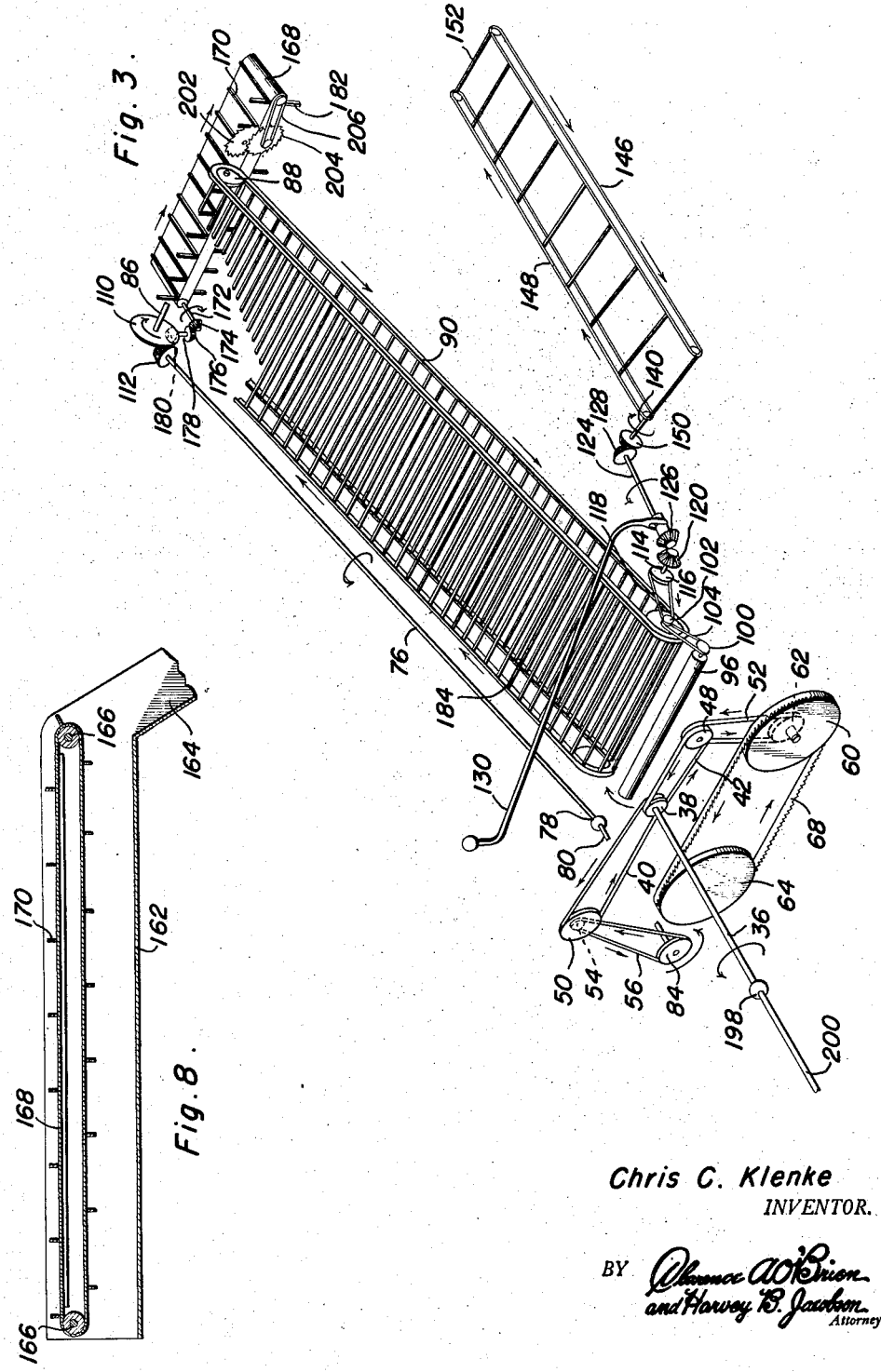
Figure 3 is a diagrammatic perspective view illustrating the manner in which the various conveyors of the present invention are driven.
Figure 4:
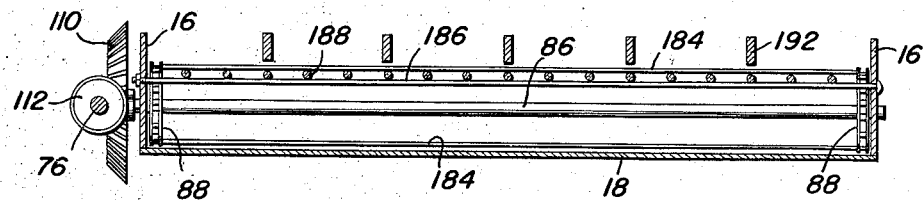
Figure 4 is an enlarged transverse sectional view taken substantially on the plane of section line 4—4 of Figure 1.
Figure 5:
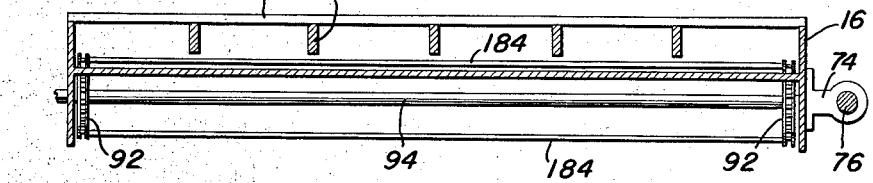
Figure 5 is an enlarged transverse sectional view taken substantially on the plane of section line 5—5 of Figure 1.
Figure 6:
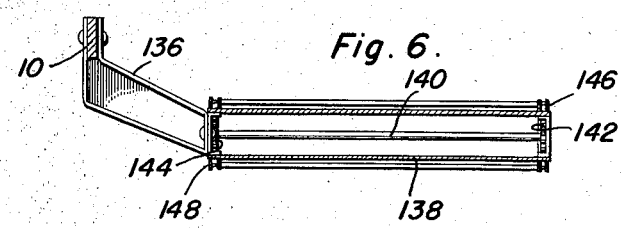
Figure 6 is an enlarged transverse vertical sectional view taken substantially on the plane of section line 6—6 of Figure 1.
Figure 7:
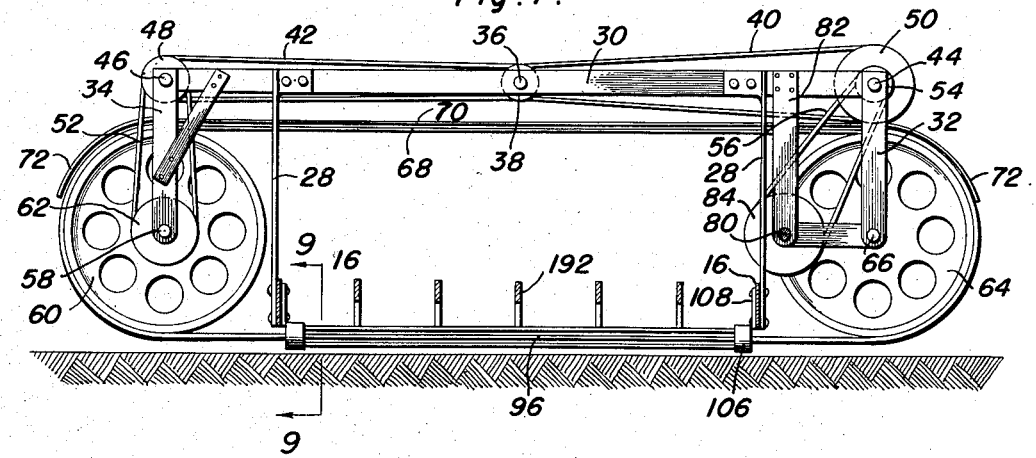
Figure 7 is an enlarged transverse vertical sectional view taken substantially on the plane of section line 7—7 of Figure 1.

A bevel gear 174 is mounted on one shaft 172 and engages a further bevel gear 176 on a rotatable shaft 178, that is suitably mounted on one side wall of the trough 118 and which supports a further bevel gear 180 that is in mesh with gear 110, see Figures 2 and 3.

Outwardly projecting arms or retainer fingers 182 are fixed to or form an integral part of the ribs 170, at the innermost ends thereof, for a purpose which will later be more fully apparent.

A plurality of spaced parallel cross bars 184 are fixed between the chains 90, are movable with the chains 90, and are disposed above and below a plurality of longitudinally spaced, transverse and parallel bars 186 that are removably carried by the side walls 16.

A further group of transversely spaced, longitudinal bars 188 are supported on and fixed to the bars 186 to provide a substantially rectangular screen that is disposed above the bottom wall of the trough 18.

Fixed between a pair of transverse beams 190 carried by the trough 18, is a plurality of spaced parallel, longitudinally extending partitions or walls 192 that are spaced above the cross bars 184.

Inclined baffles or directing chutes 194 are fixed to the walls 192 and define passages that lead to the conveyor belt 168.

Suitably secured to the frame 10, is an attaching frame 196 that will permit the present invention to be applied to a tractor or the like for hauling, and a universal coupling 198 connects the shaft 36 to the power take-off shaft 200 of the tractor which is hauling the present invention.

In order to reduce the normal size of the asparagus or vegetables which are being conducted by the delivery conveyor or belt 168, there is provided a pair of complementary saw blades 202 and 204 which are driven through a pulley and belt connection 206 to one of the shafts 172 of the rollers 166, as shown best in Figure 3 of the drawings. These blades 202 and 204 will tend to cut off any of the vegetables which overhang the inner edges of the member 162.

In practical use of the present invention, the shaft 36 is connected to the power take-off shaft of the tractor, the saw blade 68 will be rotated to cut vegetables such as asparagus, whereby the cut vegetables will be disposed on the elevating conveyor or cross bars 184 by the roller 96. As the cut vegetables are being elevated by the conveyor or cross bars 184, the small vegetables will be sieved or thinned out by the screen which is disposed beneath the elevating conveyor, since the small particles will fall between the cross bars 184 and on to the screen or bars 186 and 188 that form the screen. The thinned vegetables will then slide down the bottom wall of the trough 18 and pass downwardly through the opening 24 onto the container 26 disposed therebeneath.

The cut vegetables will be directed from the elevating conveyor or cross members 184 to the delivery conveyor or belt 168 where the ribs 170 and fingers 182 will tend to carry the same in groups to the discharge end of the belt 168. The material will fall down the inclined chute or downwardly turned end portion 164 of the member 162 and into a container which is disposed on the cross bars 152 of the container holding conveyor. By manually actuating the lever 130, the operator may retain the container on the cross bars 152 disposed into a position for receiving the vegetables discharged from the belt 168 for any predetermined length of time or until the same is properly filled.

When a further container is placed on the cross bars 152, the same will force the filled container toward the rear end of the platform 152 and which platform 154 will pivot downwardly to bear upon the ground surface and permit the container to slide on the platform to a position on the ground whereupon the platform 154 will then be raised to its normal horizontal position to engage a further container.

It should be noted that the walls 192 are so arranged as to divide or group the cut vegetables that are being elevated by the cross bars 184 and that the inclined baffles or chutes 194 will further tend to guide and to divide the groups of separated vegetables onto the delivery conveyor or belt 168.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A vegetable cutting machine comprising a wheeled frame, a cutter for cutting vegetables, an elevating conveyor for lifting vegetables cut by the cutter, means disposed between the cutter and the elevating conveyor for carrying cut vegetables to the elevating conveyor, a delivery conveyor disposed at one end of said elevating conveyor, a first shaft operatively connected to a source of power, means connecting said first shaft to said cutter for actuating the latter, means connecting said first shaft to said delivery conveyor and said elevating conveyor for rotating the same, a further conveyor disposed below and parallel to the delivery conveyor for conducting containers toward said delivery conveyor, and a manually operated clutch operatively connecting said further conveyor to said elevating conveyor for rotation of the former with the latter.

2. A vegetable cutting machine comprising a wheeled frame, a cutter at one end of said frame, a vertically inclined elevating conveyor, an auxiliary conveyor associated with said cutter and said lifting conveyor for directing vegetables cut by the cutter onto the elevating conveyor, a transversely disposed delivery conveyor at the upper end of said elevating conveyor, cutting means associated with said delivery conveyor for cutting vegetables while on said delivery conveyor, a further conveyor spaced parallel to said delivery conveyor and terminating at one end of said delivery conveyor for directing containers under said delivery conveyor to receive vegetables therefrom, and a spring mounted holding plate extending from one end of said further conveyor for receiving containers filled with vegetables.

3. A vegetable cutting machine comprising a wheeled frame having forward and rear end portions, a cutter at the forward end portion of said frame, an upwardly and rearwardly inclined elevating conveyor associated with the frame, an auxiliary conveyor disposed between the cutter and the elevating conveyor for directing vegetables cut by the cutter onto the elevating conveyor, a horizontally disposed transversely extending delivery conveyor at the rear end portion of said frame, said delivery conveyor being disposed perpendicular to the longitudinal axis of said elevating conveyor, a delivery chute associated with said delivery conveyor for receiving vegetables discharged from the delivery conveyor, cutting means disposed adjacent said delivery conveyor for trimming vegetables before the vegetables enter the delivery chute, means carried by the frame for thinning out vegetables as the same are lifted by the elevating conveyor, and a further horizontally disposed longitudinally extending conveyor spaced parallel to said delivery conveyor, said further conveyor terminating below the delivery chute to receive vegetables from the delivery chute.

4. A vegetable cutting machine comprising a wheeled frame having forward and rear end portions, a cutter at the forward end portion of said frame, an upwardly and rearwardly inclined elevating conveyor associated with the frame, an auxiliary conveyor disposed between the cutter and the elevating conveyor for directing vegetables cut by the cutter onto the elevating conveyor, a horizontally disposed delivery conveyor at the rear end portion of said frame, said delivery conveyor being disposed perpendicular to the longitudinal axis of said elevating conveyor, a delivery chute associated with said delivery conveyor for receiving vegetables discharged from the delivery conveyor, cutting means disposed adjacent said delivery conveyor for trimming vegetables before the vegetables enter the delivery chute, means carried by the frame for thinning out vegetables as the same are lifted by the elevating conveyor, a further conveyor disposed beneath and parallel to said delivery conveyor for directing containers toward said delivery conveyor, said further conveyor terminating beneath said delivery chute to receive vegetables leaving said chute, and a spring mounted holding plate extending from said further conveyor for receiving containers filled with vegetables.

CHRIS C. KLENKE.

REFERENCES CITED

The following references are of record in the file of this patent:

UNITED STATES PATENTS

| Number | Name | Date |
|---|---|---|
| 515,802 | Storey | Mar. 6, 1894 |
| 875,024 | Wheeler | Dec. 31, 1907 |
| 1,039,161 | Maurer et al. | Sept. 24, 1912 |
| 1,200,092 | Elliott | Oct. 3, 1916 |
| 1,990,250 | Pitcher | Feb. 5, 1935 |
| 2,102,379 | Nutter | Dec. 14, 1937 |
| 2,267,303 | Jordan | Dec. 23, 1941 |